US011046374B2

(12) United States Patent
Gordner et al.

(10) Patent No.: US 11,046,374 B2
(45) Date of Patent: Jun. 29, 2021

(54) METHOD FOR OPERATING A ROTATING-MASS DEVICE OF A TWO-WHEELED VEHICLE, ROTATING-MASS DEVICE AND TWO-WHEELED VEHICLE

(71) Applicant: Bayerische Motoren Werke Aktiengesellschaft, Munich (DE)

(72) Inventors: Achim Gordner, Grossberghofen (DE); Stephan Fischer, Puchheim (DE); Josef Seidl, Strasskirchen (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 338 days.

(21) Appl. No.: 16/217,431

(22) Filed: Dec. 12, 2018

(65) Prior Publication Data

US 2019/0111982 A1    Apr. 18, 2019

Related U.S. Application Data

(63) Continuation of application No. PCT/EP2017/066730, filed on Jul. 5, 2017.

(30) Foreign Application Priority Data

Aug. 10, 2016 (DE) .................... 10 2016 214 830.3

(51) Int. Cl.
*B62D 37/06* (2006.01)
*B62K 11/00* (2006.01)
(Continued)

(52) U.S. Cl.
CPC .............. *B62D 37/06* (2013.01); *B62K 11/00* (2013.01); *B60W 30/02* (2013.01); *B60W 2030/043* (2013.01); *G01C 21/18* (2013.01)

(58) Field of Classification Search
CPC ........ B62D 37/06; B62K 11/00; B60W 30/02; B60W 2030/041; B60W 2030/043
See application file for complete search history.

(56) References Cited

U.S. PATENT DOCUMENTS

| 2010/0122859 A1 | 5/2010 | Schroll |
| 2011/0231041 A1 | 9/2011 | Kim et al. |

(Continued)

FOREIGN PATENT DOCUMENTS

| CN | 103189267 A | 7/2013 |
| CN | 104246431 A | 12/2014 |

(Continued)

OTHER PUBLICATIONS

Chinese-language Office Action issued in Chinese Application No. 201780029863.3 dated Jun. 17, 2020 with English translation (14 pages).

(Continued)

*Primary Examiner* — Tony H Winner
(74) *Attorney, Agent, or Firm* — Crowell & Moring LLP

(57) ABSTRACT

A method for operating a rotating-mass device and a rotating mass device of a two-wheeled vehicle are provided. The rotating-mass device includes first and second gyroscopic instruments, each with a cardanically mounted rotating-mass device suitable for generating torque about their respective rotation axes. Pivoting of the rotating-mass devices is coordinated to influence motion of the two-wheeled vehicle about three orthogonal vehicle axes.

10 Claims, 2 Drawing Sheets

(51) Int. Cl.
    *B60W 30/02*     (2012.01)
    *G01C 21/18*     (2006.01)
    *B60W 30/04*     (2006.01)

(56) References Cited

U.S. PATENT DOCUMENTS

| | | | |
|---|---|---|---|
| 2013/0233100 A1 | 9/2013 | Kim | |
| 2015/0060163 A1* | 3/2015 | Kim | B60K 1/00 |
| | | | 180/65.8 |
| 2015/0353151 A1 | 12/2015 | Klews | |
| 2017/0043831 A1* | 2/2017 | Zhu | B62H 1/12 |
| 2017/0363429 A1 | 12/2017 | Zhu | |
| 2018/0229789 A1* | 8/2018 | Henzler | B62M 1/10 |
| 2019/0233039 A1* | 8/2019 | Krylatov | B62J 27/00 |
| 2020/0156717 A1* | 5/2020 | Brendelson | B62D 37/06 |

FOREIGN PATENT DOCUMENTS

| | | |
|---|---|---|
| CN | 204095952 U | 1/2015 |
| CN | 104968559 A | 10/2015 |
| GB | 2465020 A | 5/2010 |
| JP | 2012-201254 A | 10/2012 |
| WO | WO 2011/115699 A1 | 9/2011 |
| WO | WO 2013/130656 A1 | 9/2013 |
| WO | WO 2014/106547 A1 | 7/2014 |
| WO | WO 2016/026356 A1 | 2/2016 |

OTHER PUBLICATIONS

International Search Report (PCT/ISA/210) issued in PCT Application No. PCT/EP2017/066730 dated Sep. 25, 2017 with English translation (seven pages).

German-language Written Opinion (PCT/ISA/237) issued in PCT Application No. PCT/EP2017/066730 dated Sep. 25, 2017 (six pages).

German-language Search Report issued in counterpart German Application No. 10 2016 214 830.3 dated Jun. 23, 2017 with partial English translation (15 pages).

Chinese-language Office Action issued in Chinese Application No. 201780029863.3 dated Jan. 25, 2021 with English translation (15 pages).

Zhong S., "Inertial Technology", National Defense Industry Press, Dec. 31, 2010, p. 177-180, (12 pages).

* cited by examiner

METHOD FOR OPERATING A ROTATING-MASS DEVICE OF A TWO-WHEELED VEHICLE, ROTATING-MASS DEVICE AND TWO-WHEELED VEHICLE

CROSS REFERENCE TO RELATED APPLICATIONS

This application is a continuation of PCT International Application No. PCT/EP2017/066730, filed Jul. 5, 2017, which claims priority under 35 U.S.C. § 119 from German Patent Application No. 10 2016 214 830.3, filed Aug. 10, 2016, the entire disclosures of which are herein expressly incorporated by reference.

BACKGROUND AND SUMMARY OF THE INVENTION

The invention relates to a method for operating a rotating-mass device of a two-wheeled vehicle, the rotating-mass device having a first gyroscope instrument and a second gyroscope instrument, the first gyroscope instrument having a first cardanically mounted rotating mass with a first rotational axis, wherein the first rotating mass can be rotated in order to bring about a first angular momentum, and the first rotational axis can be pivoted in a controlled spatial fashion in order to bring about a first torque, the second gyroscope instrument having a second cardanically mounted rotating mass with a second rotational axis, wherein the second rotating mass can be rotated in order to bring about a second angular momentum, and the second rotational axis can be pivoted in a controlled spatial fashion in order to bring about a second torque, the two-wheeled vehicle having three orthogonal vehicle axes, wherein the first torque and the second torque act on the two-wheeled vehicle.

Furthermore, the invention relates to a rotating-mass device for a two-wheeled vehicle, the rotating-mass device having a first gyroscope instrument, a second gyroscope instrument and an electric control device, the first gyroscope instrument having a first cardanically mounted rotating mass with a first rotational axis, a first rotary drive for the controlled rotation of the first rotating mass in order to bring about a first angular momentum, and a first pivoting drive for the controlled spatial pivoting of the first rotational axis in order to bring about a first torque, the second gyroscope instrument having a second cardanically mounted rotating mass with a second rotational axis, a second rotary drive for the controlled rotation of the second rotating mass in order to bring about a second angular momentum, and a second pivoting drive for the controlled spatial pivoting of the second rotational axis in order to bring about a second torque.

Furthermore, the invention relates to a two-wheeled vehicle having vehicle wheels, three orthogonal vehicle axes and a rotating-mass device.

WO 2011/115699 A1 discloses an apparatus which has a frame and a front wheel and a rear wheel which are connected to the frame, at least two gyroscopes which are connected to the frame, wherein each gyroscope comprises a flywheel, wherein the apparatus also has a multiplicity of sensors which are configured to detect an orientation of the frame, an orientation of the front wheel with respect to the frame, an orientation and rotational speed of the flywheels, and a speed of the apparatus, and an electronic control system which is configured to set at least one from the group of the orientation and the rotational speed of at least one of the flywheels, specifically at least partially, on the basis of the data from the multiplicity of sensors and an input which is provided for changing at least one from the group of the speed and device and direction of the apparatus.

WO 2013/130656 A1 discloses a system having a control torque gyroscope device comprising a flywheel, a flywheel drive motor in order to drive the flywheel, a housing with three degrees of freedom comprising the flywheel and the flywheel drive motor, and one or more motors for independently moving the housing in the degrees of freedom, and a controller for controlling a position of the control torque gyroscope device.

The invention is based on the object of improving a method specified at the beginning. Furthermore, the invention is based on the object of improving in structural and/or functional terms a rotating-mass device which is specified at the beginning. Furthermore, the invention is based on the object of improving in structural and/or functional terms a two-wheeled vehicle which is specified at the beginning.

The first rotating mass and the second rotating mass can be rotated at the same rotational speed. The first rotating mass and the second rotating mass can be rotated at different rotational speeds. The term "controlled" means here, in particular, under electrical open-loop and/or closed-loop control. The torques can each have a portion about the first rotational axis, a portion about the second rotational axis and/or a portion about the third rotational axis. The rotational axes can be pivoted with respect to one another in such a way that portions of the first torque and of the second torque about the first axis of the vehicle are added. The rotational axes can be pivoted with respect to one another in such a way that portions of the first torque and of the second torque about the two other axes of the vehicle counteract one another. The total torque can change over time. The total torque can have a predefined profile over time.

The first rotational axis and the second rotational axis can be pivoted with respect to one another in such a way that singularities are avoided. The first rotational axis and the second rotational axis can be pivoted with respect to one another in such a way that the total torque has an uninterrupted, constant and/or continuous profile.

The first rotational axis and the second rotational axis can be pivoted with respect to one another in a phase-shifted fashion. The first rotational axis and the second rotational axis can be pivoted phase-shifted by 180° with respect to one another.

The vehicle axes can be a rolling axis, a pitching axis and a yaw axis. The first vehicle axis can be the rolling axis, the pitching axis or the yaw axis.

The first rotational axis and/or the second rotational axis can be pivoted in order to compensate a vehicle movement. The first rotational axis and/or the second rotational axis can be pivoted in order to compensate an effect of an intended vehicle movement on an orientation of the vehicle axes. An intended vehicle movement can be caused, for example, by curvature of a roadway or an intentionally initiated oblique position.

The first rotational axis and/or the second rotational axis can be pivoted in order to influence an oblique position of the vehicle. The first rotational axis and/or the second rotational axis can be pivoted in order to increase or reduce an oblique position of the vehicle.

The first rotational axis and/or the second rotational axis can be pivoted in order to influence an adhesion potential of a vehicle tire. The first rotational axis and/or the second rotational axis can be pivoted in order to influence a wheel load displacement onto a vehicle tire.

The first gyroscope instrument and the second gyroscope instrument can be embodied in a structurally identical fashion. The gyroscope instruments can each have a housing. The rotary drives can each be embodied as an electric motor. In each case a vehicle drive can serve as a rotary drive. The pivoting drives can each be embodied as an electric motor. The rotational axes can each be pivotable about two orthogonal pivoting axes. The rotational axes can each be pivotable spatially through 360°. The electrical control device can be connected in each case in a signal-conducting fashion to the gyroscope instruments. The electrical control device can serve to perform open-loop and/or closed-loop control. The electrical control device can also be referred to as a control unit. The electrical control device can have a computing device. The electrical control device can have a memory device. The electrical control device can be connected in a signal-conducting fashion to at least one further electrical control device of the two-wheeled vehicle, in particular via a bus system, such as a CAN bus.

A two-wheeled vehicle having vehicle wheels, three orthogonal vehicle axes and a rotating-mass device is characterized in that the two-wheeled vehicle is suitable for carrying out a method of the present invention.

The two-wheeled vehicle can be a single-track vehicle. The two-wheeled vehicle can be a motor vehicle. The two-wheeled vehicle can be a powered two-wheeled vehicle. The two-wheeled vehicle can be a motorcycle. The two-wheeled vehicle can be a motor scooter. The two-wheeled vehicle can have at least one vehicle drive. The two-wheeled vehicle can have at least one drivable vehicle wheel. The two-wheeled vehicle can have a front wheel and a rear wheel. The at least one vehicle drive can be an internal combustion engine. The at least one vehicle drive can be an electric machine. The electric machine can be capable of being operated as a motor. The electric machine can be capable of being operated as a generator. The two-wheeled vehicle can have an electrical energy store. The electrical energy store can be an accumulator. The electrical energy store can be a capacitor, in particular a super-capacitor. The three two-wheeled vehicle axes can be a rolling axis, a pitching axis and a yaw axis.

The two-wheeled vehicle can have a vehicle longitudinal axis. The two-wheeled vehicle can be unstable about the vehicle longitudinal axis. The rolling axis can be parallel to the vehicle longitudinal axis. The pitching axis can be perpendicular with respect to the rolling axis and parallel to a roadway surface. The yaw axis can be perpendicular with respect to the rolling axis and with respect to a roadway surface.

In summary and in other words, the invention therefore provides, inter alia, a gyroscope for stabilizing an oblique position of a motorbike. Two gyroscopes which are controlled actively by means of three axes can be combined with one another in such a way that the two reaction torques, composed of a desired rolling torque and a parasitic pitching torque and yaw torque, are continuously added together to form a continuous and constant supporting torque/rolling torque. A trajectory and speeds at which the two gyro axes move continuously is to be selected such that singularities at a desired rolling torque/useful torque are avoided. In addition to the stabilizing rolling torque, parasitic pitching torques and yaw torques can additionally arise on these trajectories. These torques can be compensated by the second gyroscope, the trajectory of which is phase-shifted. Undesired gyro reactions, for example uphill travel or oblique positions which are intentionally initiated by the driver can be cancelled out by active control of the two gyro axes, by means of an electronic position detection system of a vehicle and a closed-loop control system which is appropriate for the latter. Two gyroscopes can assist one another additively. Trajectories whose singularity points are avoided can ensure periodic operation on the trajectory. Parasitic reaction torques can be cancelled out by phase-shifted trajectories of the two gyroscopes. An electronic actuation system can detect unevennesses in the roadways and desired longitudinal dynamics such as uphill travel and actuate the gyroscopes correspondingly, with the result that no undesired reaction torque is set.

The invention makes it possible to produce a continuous assistance torque. Outlay on installation, the installation space required, financial expenditure and/or expenditure in terms of fabrication are reduced. Active and continuous stabilization of the oblique position are made possible. The mass and size of the components are reduced. The comfort is increased. The safety is increased. Vehicle dynamics can be influenced.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
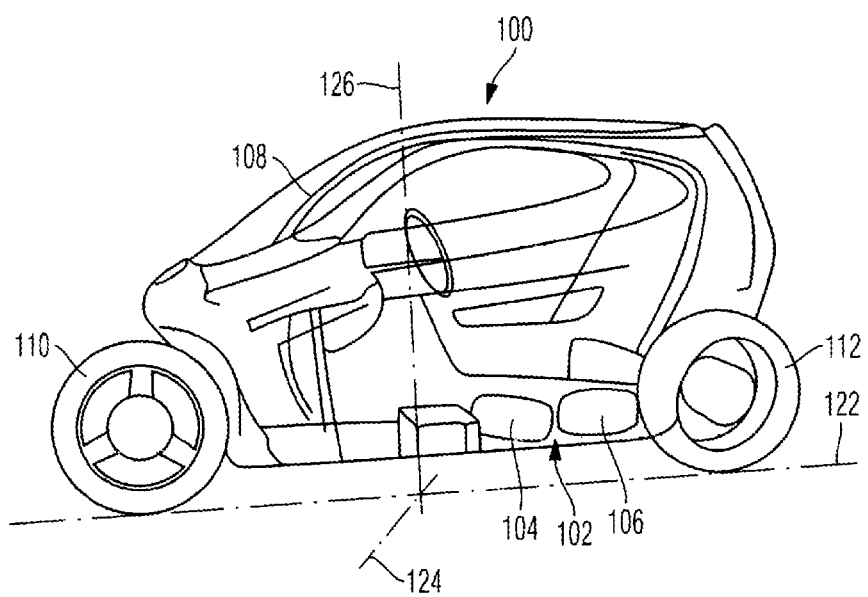
FIG. 1 shows a two-wheeled vehicle with a rotary-mass device with two gyroscope instruments in accordance with an embodiment of the present invention.

FIG. 1 shows a two-wheeled vehicle 100 with a rotating-mass device 102 with two gyroscope instruments 104, 106. The two-wheeled vehicle 100 has a frame, paneling 108 and two vehicle wheels 110, 112. The front vehicle wheel 110 can be steered and the rear vehicle wheel 112 can be driven. The two-wheeled vehicle 100 is a single-track vehicle and therefore unstable for reasons owing to the system.

Figure 2:
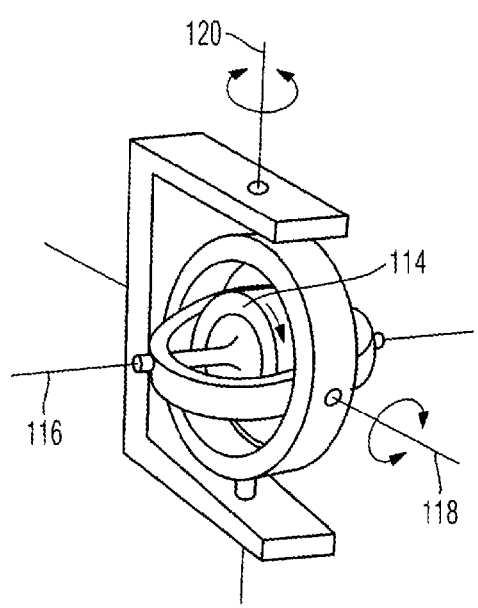
FIG. 2 shows a gyroscope instrument with a cardanically mounted rotating mass in accordance with an embodiment of the present invention.

The gyroscope instruments 104, 106 are each embodied identically in terms of structure. FIG. 2 shows a gyroscope instrument, as 104, 106. The gyroscope instruments 104, 106 each have a cardanically mounted rotating mass, as 114. The rotating mass 114 can be rotated in a controlled fashion about a rotational axis 116 in order to bring about an angular momentum. The gyroscope instruments 104, 106 each have a rotary drive for rotating the rotating mass 114. The rotational axis 116 can be pivoted in a controlled spatial fashion about two orthogonal pivoting axes 118, 120, in order to bring about a torque. The rotational axis 116 can be freely pivoted through 360° both about the pivoting axis 118 and about the pivoting axis 120. The gyroscope instruments 104, 106 each have a pivoting drive for pivoting the rotating mass 114. The pivoting drive has in each case a motor for the pivoting axes 118, 120.

The torques of the gyroscope instruments 104, 106 act on the two-wheeled vehicle 100. The two-wheeled vehicle 100 has a rolling axis 122, a pitching axis 124 and a yaw axis 126. The torques of the gyroscope instruments 104, 106 each have a portion about the rolling axis 122, a portion about the pitching axis 124 and/or a portion about the yaw axis 126.

The gyroscope instruments 104, 106 are activated in a controlled fashion such that the portions of the gyroscope instruments 104, 106 about a first vehicle axis, for example about the rolling axis 122, are added to form a predefined total torque and the portions of the torques of the gyroscope instruments 104, 106 about one of the two other vehicle axes, for example about the pitching axis 124 and the yaw axis 126, are compensated.

The predefined total torque is predefined, for example, in such a way that an oblique position of a vehicle during cornering is reduced if there is a risk of a fall toward the inside of the bend owing to the vehicle wheels slipping away as a result of inadequate adhesion to the roadway, or an oblique position of the vehicle is increased during cornering if there is a risk of suddenly being placed in an upright position and rolling over toward the outside of the bend as a result of suddenly recovered static friction after the vehicle wheels have slipped away.

Figure 3:
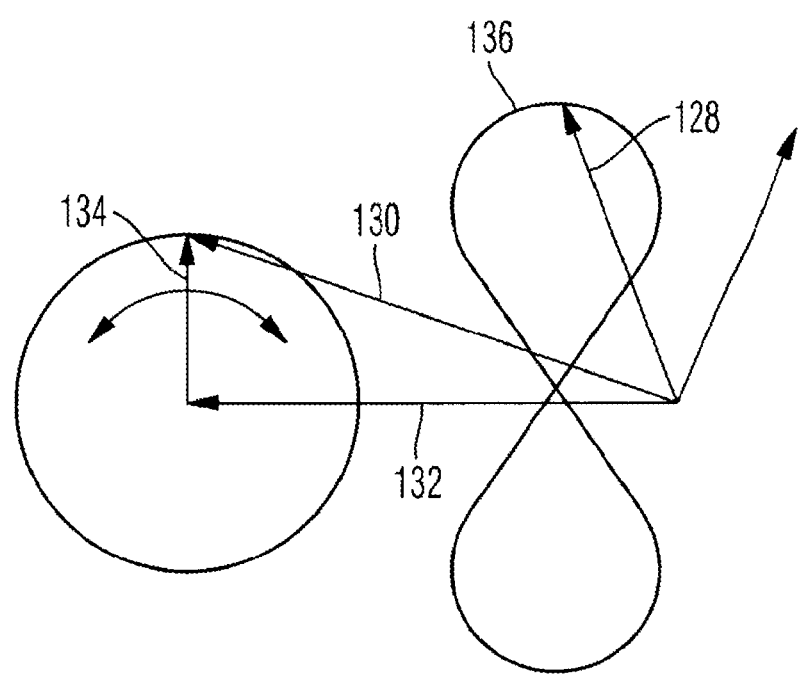
FIG. 3 shows trajectories and speed profiles of a rotating mass in accordance with an embodiment of the present invention.

FIG. 3 shows trajectories and speed profiles of the rotating mass 114 of a gyroscope instrument like 104 and 106. The rotating mass 114 rotates about the rotational axis 116 with the result that an angular momentum 128 is brought about. The rotating mass 114 is pivoted in order to produce a torque 130 which acts on the two-wheeled vehicle 100. The torque 130 has a portion 132 about the rolling axis 122 and parasitic portions 134 about the other vehicle axes. A pivoting movement of the rotational axis 116 takes place along a trajectory 136. The trajectory 136 is selected in such a way that singularities in the predefined torque 130 are avoided.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

REFERENCE NUMBERS

100 Two-wheeled vehicle
102 Rotating-mass device
104 Gyroscope instrument
106 Gyroscope instrument
108 Paneling
110 Vehicle wheel
112 Vehicle wheel
114 Rotating mass
116 Rotational axis
118 Pivoting axis
120 Pivoting axis
122 Rolling axis
124 Pivoting axis
126 Yaw axis
128 Angular momentum
130 Torque
132 Portion
134 Parasitic portions
136 Trajectory

What is claimed is:

1. A method for operating a rotating mass device of a two wheeled vehicle having three orthogonal vehicle axes, the rotating mass device including a first gyroscope instrument and a second gyroscope instrument,
the first gyroscope instrument having a first cardanically mounted rotating mass with a first rotational axis, the first rotating mass being configured to rotate in a controlled fashion in order to bring about a first angular momentum and the first rotational axis being pivotable in a controlled spatial fashion in order to bring about a first torque which acts on the two wheel vehicle,
the second gyroscope instrument having a second cardanically mounted rotating mass with a second rotational axis, the second rotating mass being configured to rotate in a controlled fashion in order to bring about a second angular momentum and the second rotational axis being pivotable in a controlled spatial fashion in order to bring about a second torque which acts on the two wheel vehicle,
comprising the acts of:
rotating the first rotating mass;
rotating the second rotating mass; and
pivoting the first rotational axis and the second rotational axis with respect to one another, such that
portions of the first torque and of the second torque about a first vehicle axis of the three vehicle axes add to form a continuous and constant predefined total torque, and
portions of the first torque and of the second torque about second and third vehicle axes of the three vehicles axes compensate one another.

2. The method as claimed in claim 1, wherein
the first rotational axis and the second rotational axis are pivoted with respect to one another in a manner which avoids singularities.

3. The method as claimed in claim 2, wherein
the first rotational axis and the second rotational axis are pivoted with respect to one another in a phase shifted manner.

4. The method as claimed in claim 1, wherein
a first vehicle axis of the three vehicle axes is a roll axis, and
a second vehicle axis of the three vehicle axes is a pitch axis or a yaw axis.

5. The method as claimed in claim 4, wherein
one or both of the first rotational axis and the second rotational axis are pivoted in a manner which compensates a vehicle movement.

6. The method as claimed in claim 5, wherein
one or both of the first rotational axis and the second rotational axis are pivoted in a manner which influences an oblique position of the vehicle.

7. The method as claimed in claim 5, wherein
one or both of the first rotational axis and the second rotational axis are pivoted in a manner which influences an adhesion potential of a vehicle tire.

8. A rotating mass device for a two-wheeled vehicle having three orthogonal vehicle axes, comprising:
a first gyroscope instrument;
a second gyroscope instrument; and
an electric control device,
wherein
the first gyroscope instrument includes
a first cardanically mounted rotating mass with a first rotational axis,
a first rotary drive configured to provide controlled rotation of the first rotating mass and generate a first angular momentum, and
a first pivoting drive configured to provide controlled spatial pivoting of the first rotational axis and generate a first torque, and
the second gyroscope instrument includes a second cardanically mounted rotating mass with a second rotational axis,
a second rotary drive configured to provide controlled rotation of the second rotating mass and generate a second angular momentum, and
a second pivoting drive configured to provide controlled spatial pivoting of the second rotational axis and generate a second torque,
the electric control device is configured to control
rotation of the first rotating mass,
rotation of the second rotating mass, and
pivoting of the first rotational axis and the second rotational axis with respect to one another, such that portions of the first torque and of the second torque about a first vehicle axis of the three vehicle axes add to form a continuous and constant predefined total torque, and portions of the first torque and of the second torque about second and third of the three vehicles axes compensate one another.

9. A two wheeled vehicle having the rotating mass device as claimed in claim 8.

10. A two wheeled vehicle having three orthogonal vehicle axes, comprising:
vehicle wheels; and
a rotating mass device, the rotating mass device including:
a first gyroscope instrument;
a second gyroscope instrument; and
an electric control device,
wherein
the first gyroscope instrument includes
a first cardanically mounted rotating mass with a first rotational axis,
a first rotary drive configured to provide controlled rotation of the first rotating mass and generate a first angular momentum, and
a first pivoting drive configured to provide controlled spatial pivoting of the first rotational axis and generate a first torque, and
the second gyroscope instrument includes
a second cardanically mounted rotating mass with a second rotational axis,
a second rotary drive configured to provide controlled rotation of the second rotating mass and generate a second angular momentum, and
a second pivoting drive configured to provide controlled spatial pivoting of the second rotational axis and generate a second torque,
the electric control device is configured to control
rotation of the first rotating mass,
rotation of the second rotating mass, and
pivoting of the first rotational axis and the second rotational axis with respect to one another, such that portions of the first torque and of the second torque about a first vehicle axis of the three vehicle axes add to form a continuous and constant predefined total torque, and portions of the first torque and of the second torque about second and third ones of the three vehicles axes compensate one another, and
the first vehicle axis is a roll axis and a second vehicle axis of the three vehicle axes is a pitch axis or a yaw axis.

* * * * *